(12) United States Patent
Hsieh et al.

(10) Patent No.: US 10,524,554 B2
(45) Date of Patent: Jan. 7, 2020

(54) EXCHANGEABLE-BATTERY PHOTOCURING DEVICE, AN EXCHANGEABLE-BATTERY PHOTOCURING DEVICE WITH A SLIDABLE LID, AND A PORTABLE BATTERY PHOTOCURING DEVICE WITH A SLIDABLE LID

(71) Applicant: COSMEX CO., LTD., New Taipei (TW)

(72) Inventors: Wan Chieh Hsieh, New Taipei (TW); Ya Wen Wu, New Taipei (TW); Wen Shan Chung, New Taipei (TW); Yu Ching Li, New Taipei (TW)

(73) Assignee: COSMEX CO. LTD., New Taipei (TW)

( * ) Notice: Subject to any disclaimer, the term of this patent is extended or adjusted under 35 U.S.C. 154(b) by 0 days.

(21) Appl. No.: 15/862,351

(22) Filed: Jan. 4, 2018

(65) Prior Publication Data
US 2019/0200721 A1 Jul. 4, 2019

(30) Foreign Application Priority Data
Nov. 30, 2017 (TW) .............................. 106217836 U (51) Int. Cl.
*A45D 29/00* (2006.01)
*H02J 7/00* (2006.01)
*H01M 2/10* (2006.01)
(52) U.S. Cl.
CPC .......... *A45D 29/00* (2013.01); *H01M 2/1005* (2013.01); *H01M 2/1022* (2013.01); *H02J 7/0068* (2013.01); *A45D 2200/205* (2013.01); *H01M 2220/30* (2013.01)
(58) Field of Classification Search
CPC ............. A45D 29/00; A45D 2200/205; H01M 2/1005; H01M 2/1022; H02J 7/0068
USPC ................................ 250/492.1, 493.1, 504 R
See application file for complete search history.

(56) References Cited

U.S. PATENT DOCUMENTS

| 8,993,983 B2 * | 3/2015 | Li | ............................. | F26B 3/28 |
| | | | | 250/455.11 |
| 9,351,555 B2 * | 5/2016 | Li | ............................. | F26B 3/28 |
| 9,810,479 B2 * | 11/2017 | Haile | ........................ | F26B 3/28 |

* cited by examiner

*Primary Examiner* — Nicole M Ippolito
(74) *Attorney, Agent, or Firm* — Muncy, Geissler, Olds & Lowe, P.C.

(57) ABSTRACT

The present invention provides an exchangeable-battery photocuring device, comprising a supporting frame, having a plurality of walls, wherein the plurality of walls constitutes a chamber having at least one opening; a UV LED module, disposed on the supporting frame; a outer housing, having an external opening corresponding to the opening of the supporting frame; a control module; an exchangeable battery module, disposed on the supporting frame, wherein the exchangeable battery module comprises a battery holder and a battery, and the exchangeable battery module is electrically connected to the control module, and a handle. The present invention applying an exchangeable battery module achieves that the photocuring device is used without being constrained by location and space. Furthermore, the present invention also provides an exchangeable-battery photocuring device with a slidable lid and a portable battery photocuring device with a slidable lid.

17 Claims, 4 Drawing Sheets

EXCHANGEABLE-BATTERY PHOTOCURING DEVICE, AN EXCHANGEABLE-BATTERY PHOTOCURING DEVICE WITH A SLIDABLE LID, AND A PORTABLE BATTERY PHOTOCURING DEVICE WITH A SLIDABLE LID

BACKGROUND OF THE INVENTION

1. Technical Field

The present invention relates to a photocuring device, in particular to a portable photocuring device having a battery.

2. Description of Related Art

Nail art has been popular in many countries in recent years. Nail art is the art that applies various paints and accessories to fingernails or toenails creatively and curing them with gelatinous substances to maintain the picturesque patterns on the nails.

The methods of curing nail art can generally be classified into two types: thermal curing and photocuring. Thermal curing is a more traditional method by either evaporating solvents in gelatinous substances through heating or accelerating drying of the gelatinous substances by air circulation so that the liquid gelatinous substances are solidified. The advantages are low cost and safe reaction. However, thermal curing is slow and energy inefficient, so it takes a long time to dry. Moreover, the solvents also generate unpleasant odor when they evaporate, and the patterns on the mails may be deformed because of hot air stream. Therefore, the mainstream technique for solidification of nail art has shifted to photocuring in recent years.

The photocuring technique changes the gelatinous substances coated on nails to photocuring gels. The more common one uses ultraviolet light (UV) as a light source for curing, a process solidifies the liquid gelatinous substances. The advantages of photocuring are fast reaction, short curing time and high energy efficiency. Moreover, photocuring can be carried out at room temperature, and the UV curing resin does not contain organic solvents so that it is more comfortable for users during the process of nail art. At present, various photocuring devices are available on the market for users to choose.

However, the conventional photocuring devices must rely on external power supply. Therefore, the location where photocuring can be performed is restricted to places with a socket (i.e., external power supply), and the mobility is also limited by the length of the power cord. Furthermore, most photocuring devices are in rectangular or arc shape, which is convenient to design. Such shape plus an external power cord makes it difficult for the devices to be moved.

SUMMARY OF THE INVENTION

For the conventional battery photocuring devices, batteries are fixed in the devices. Users often face the problem of insufficient power when using the photocuring devices without external power supply. In addition, in the event of aging or damage to an internal battery, the whole device must be eliminated, resulting in high cost of replacement.

To overcome foresaid drawback, the primary object of the present invention is to provide an exchangeable-battery photocuring device, comprising: a supporting frame having a plurality of walls, and the plurality of walls constitute a chamber having at least one opening; a UV LED module disposed on the supporting frame and further comprising a board and at least one UV LED; wherein the UV LED module is able to emits light toward the base; an outer housing disposed on top of the support frame and covering the UV LED module, wherein the outer housing has an external opening corresponding to the opening of the supporting frame; a control module disposed on or inside of the outer housing, wherein the control module comprises a control board for controlling the UV LED module and a control button or a control panel; an exchangeable battery module disposed on or inside of the outer housing, wherein the exchangeable battery module comprises a battery holder and a battery, and the exchangeable battery module is electrically connected to the control module; and a handle.

Further, the handle is a movable handle or a fixed handle.

Further, the handle is disposed on the outer housing by a detachable means or formed integrally with the outer housing; wherein the detachable means is a buckle structure, a tenon structure or a screw structure.

Further, the handle further comprises a handheld positioning portion; wherein the handheld positioning portion is one or a plurality of notch or an anti-slip structure.

Further, the power unit is able to connect to an external power supply, and the power unit is electrically connected to the control module.

Further, the battery is controlled by the control module to charge or discharge, and the battery is able to be charged by the power unit or by a charger.

Further, the battery holder holds the battery through a detachable means, and the detachable means is a tenon structure, a buckle structure, a magnetic structure, a spring structure, a jack strip structure or a screw structure.

Further, the battery further comprises one or a plurality of first positioning portion disposed on one side or two sides of the battery; and the battery holder further comprises a second positioning portion disposed on one side or two sides of the battery holder corresponding to the first positioning portion.

Further, the exchangeable-battery photocuring device further comprises a base having one or a plurality of positioning portion for positioning user's fingers, wherein the base and the supporting frame are mutually assembled to each other through a plurality of magnetic element between the base and the supporting frame.

Further, the exchangeable-battery photocuring device further comprises a heat-dissipation module configured between the supporting frame and the outer housing.

Further, the plurality of walls of the supporting frame and the base are light reflective.

Further, the UV LED module further comprises a plurality of cone reflectors set on the UV LED, and the openings of the cone reflectors toward the base through the supporting frame.

Further, the exchangeable-battery photocuring device further comprises a display module electrically connected to the control module; and the display module is a touch screen, a display screen, a digital screen or a plurality of indicating lights.

Further, the exchangeable-battery photocuring device further comprises a light unit for displaying operation condition.

Another object of the present invention is to provide an exchangeable-battery photocuring device with a slidable lid, comprising the exchangeable-battery photocuring device described above and a slidable lid portion configured on the outer housing; wherein the slidable lid portion comprises a slide track configured on periphery of the external opening of the outer housing, a sliding element corresponding to the slide track, a lid having the sliding element and slidable through the slide track, and a plurality of magnetic positioning elements allowing the outer housing and the lid to mutually magnetic attract to each other in order to position the lid; wherein, the lower end of the lid has a curved edge, and the curved edge corresponds to the external opening of the outer housing and the opening of the supporting frame.

Another object of the present invention is to provide a portable battery photocuring device with a slidable lid, comprising: a supporting frame having a plurality of walls, and the plurality of walls constitute a chamber having at least one opening; a UV LED module disposed on the supporting frame and further comprising a board and at least one UV LED; wherein the UV LED module is able to emits light toward the base; an outer housing disposed on top of the support frame and covering the UV LED module, wherein the outer housing has an external opening corresponding to the opening of the supporting frame; a control module disposed on or inside of the outer housing, wherein the control module comprises a control board for controlling the UV LED module and a control button or a control panel; a battery module disposed on or inside of the outer housing, wherein the battery module comprises a battery holder and a battery, and the battery module is electrically connected to the control module; and a slidable lid portion, comprising a slide track configured on periphery of the external opening of the outer housing, a sliding element corresponding to the slide track, a lid having the sliding element and slidable through the slide track, and a plurality of magnetic positioning element allowing the outer housing and the lid to mutually magnetic attract to each other in order to position the lid.

Another object of the present invention is to provide an exchangeable-battery photocuring device, comprising: a supporting frame having a plurality of walls, and the plurality of walls constitute a chamber having at least one opening; a UV LED module disposed on the supporting frame and further comprising a board and at least one UV LED; wherein the UV LED module is able to emits light toward the base; an outer housing disposed on top of the support frame and covering the UV LED module, wherein the outer housing has an external opening corresponding to the opening of the supporting frame; a control module disposed on or inside of the outer housing, wherein the control module comprises a control board for controlling the UV LED module and a control button or a control panel; an exchangeable battery module disposed on or inside of the outer housing, wherein the exchangeable battery module comprises a battery holder and a battery, and the exchangeable battery module is electrically connected to the control module; and a base.

Still another object of the present invention is to provide an exchangeable-battery photocuring device, comprising: a supporting frame having a plurality of walls, and the plurality of walls constitute a chamber having at least one opening; a UV LED module disposed on the supporting frame and further comprising a board and at least one UV LED; wherein the UV LED module is able to emits light toward the base; an outer housing disposed on top of the support frame and covering the UV LED module, wherein the outer housing has an external opening corresponding to the opening of the supporting frame; a control module disposed on or inside of the outer housing, wherein the control module comprises a control board for controlling the UV LED module and a control button or a control panel; and an exchangeable battery module disposed on or inside of the outer housing, wherein the exchangeable battery module comprises a battery holder and a battery, and the exchangeable battery module is electrically connected to the control module.

The exchangeable-battery photocuring device, exchangeable battery photocuring device with a slidable lid and portable battery photocuring device with a slidable lid of the present invention have improved the power supply mode of the conventional photocuring devices, which can only rely on external power supply. The present invention increases the mobility of photocuring devices through rechargeable batteries, making portable photocuring device a reality. Moreover, the present invention also allows a handle and exchangeable battery module, which make the device portable and further enhance the portability of the photocuring device so that the application of the photocuring devices is less restricted by location and space. Furthermore, the slidable lid portion of the prevent invention can be smoothly slid and positioned freely so that it can effectively shield the UV light from the opening of the UV LED when the photocuring device is under operation, and thus reduces the light hazard caused by the photocuring device.

DETAILED DESCRIPTION OF THE EMBODIMENT OF THE INVENTION

A detailed description and the technical contents of the present invention are given below with reference to the accompanying drawings. Furthermore, for easier illustrating, the drawings of the present invention are not a certainly the practical proportion and are not limited to the scope of the present invention.

The use of "or" means "and/or" unless stated otherwise. The use of "comprise" means not excluding the presence or addition of one or more other components, steps, operations, or elements to the described components, steps, operations, or elements, respectively. Similarly, "comprise," "comprises," "comprising" "include," "includes," and "including" are interchangeable and not intended to be limiting. As used herein and in the appended claims, the singular forms "a," "an," and "the" include plural referents unless the context dictates otherwise. The terms "a", "an," "the," "one or more," and "at least one," for example, can be used interchangeably herein.

The exchangeable-battery photocuring device, exchangeable battery photocuring device with a slidable lid and portable battery photocuring device with a slidable lid described herein are not limited to nail art field and can also be used in other applications requiring photocuring. The present invention does not limit the scope of application of the exchangeable-battery photocuring device, exchangeable battery photocuring device with a slidable lid and portable battery photocuring device with a slidable lid.

The present invention is more detailed illustrated by the example embodiments as below. While example embodiments are disclosed herein, it should be understood that they are used for illustrating the present invention, not for limiting the scope of the present invention.

Referring to FIGS. 1 to 4, which are the schematic view of the appearance, top view of the exploded drawing, bottom view of the exploded drawing and battery-insertion diagram of a preferred embodiment of the exchangeable-battery photocuring device of the present invention, respectively. As shown in the figures:

I. First Embodiment

Figure 1:
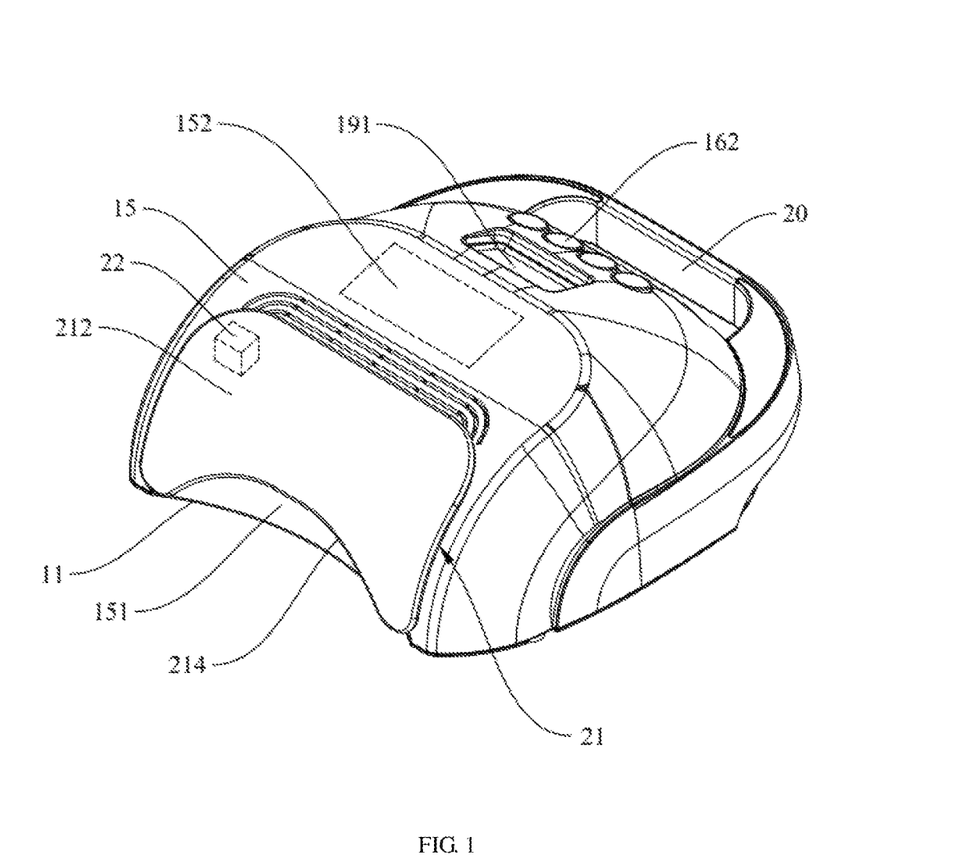
FIG. 1 is a schematic view of the appearance of a preferred embodiment of the present invention.

As shown in FIG. 1, the first embodiment of the exchangeable-battery photocuring device of the present invention comprises: an exchangeable battery module 12, a supporting frame 13, a UV LED module 14, an outer housing 15 and a control module 16, and preferably further comprises a base 11, a heat dissipation module 18, a display module 19, a handle 20 and a light unit 152.

The base 11 and the supporting frame 13 can be assembled by a detachable means, such as magnetic element(s) 17 or tenon(s), which are not limited by the present invention. In this embodiment, the base 11 and the supporting frame 13 is assembled by a plurality of magnetic elements 17.

The base 11 has positioning portion(s) 111 for positioning user's fingers. The positioning portion(s) can be one or a plurality of grooves or protrusions or connection of different materials, and the positioning portion can be in the form of a point, a circle, an ellipse or a strip. As long as it is a means for positioning finger, it is the positioning portion 111 described herein; therefore, the present invention does not limit the form of the positioning portion 111. In the first embodiment, the positioning point 111 is a strip protrusion. In addition, the base can have one or a plurality of vents 112 to assist heat dissipation of the exchangeable-battery photocuring device 1.

Figure 2:
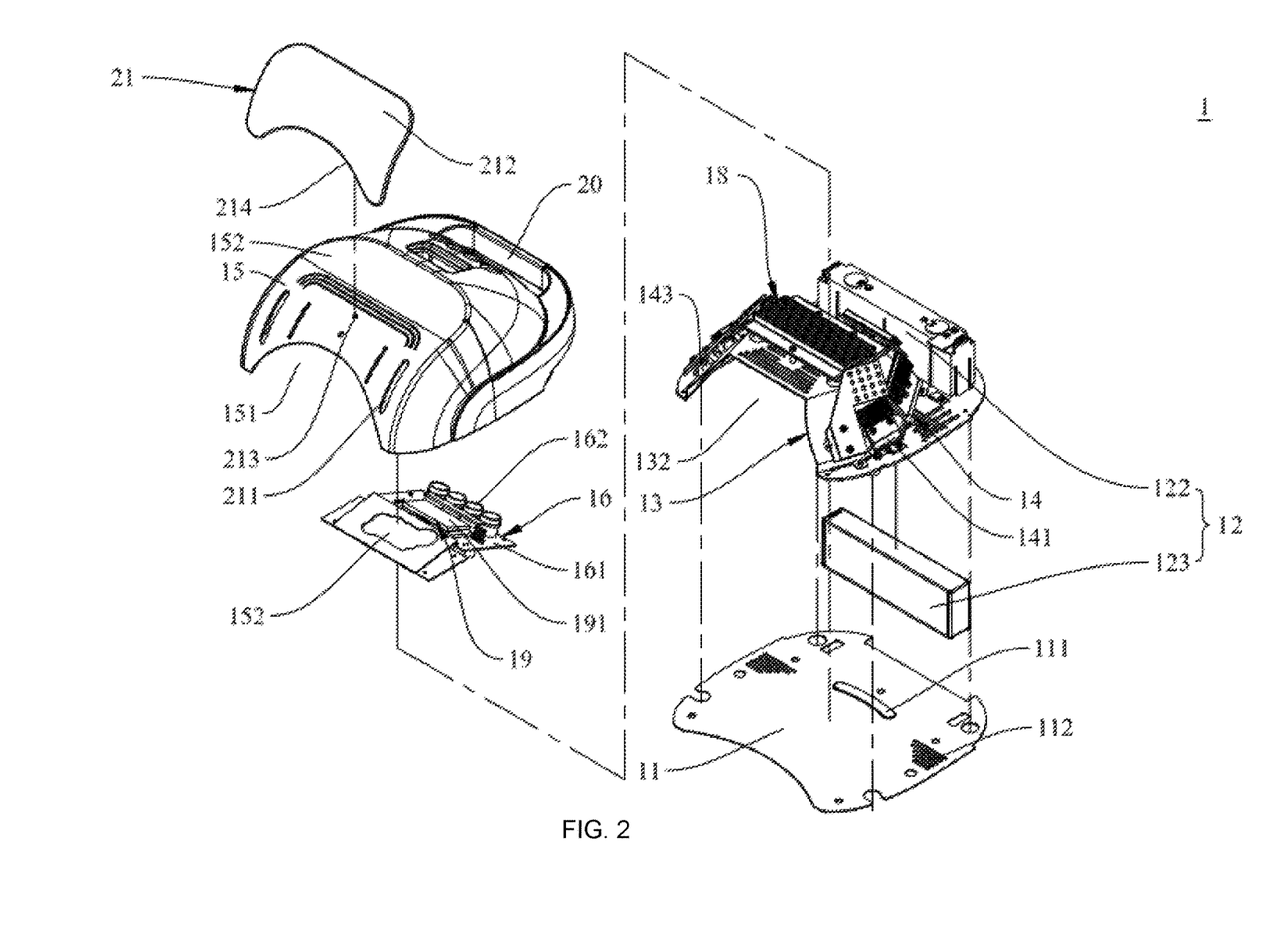
FIG. 2 is a top view of the exploded drawing of a preferred embodiment of the present invention.
Figure 3:
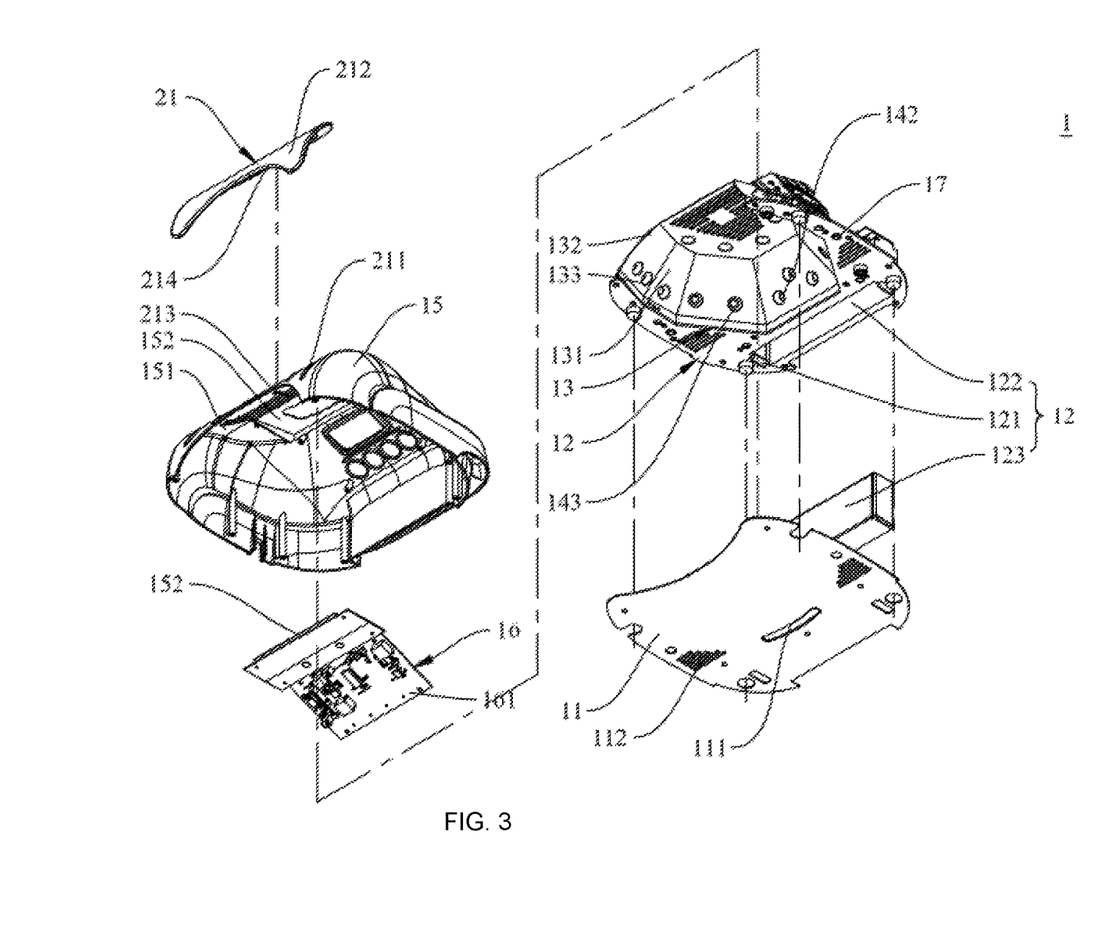
FIG. 3 is a bottom view of the exploded drawing of a preferred embodiment of the present invention.

As shown in FIG. 2 and FIG. 3, the exchangeable battery module 12 is disposed on or inside of the outer housing 15, wherein the exchangeable battery module 12 comprises a battery holder 122 and a battery 123, wherein the battery holder 122 can hold the battery 123, and the exchangeable battery module 12 is electrically connected to the control module 16. In addition, the exchangeable-battery photocuring device 1 of the invention further comprises a power unit 22; wherein the power unit 22 is able to connect to an external power supply, and the power unit 22 is electrically connected to the control module 16. Such setting allows the exchangeable-battery photocuring device 1 of the present invention to be powered by the internal power supply provided by the exchangeable battery module 12 or the external power supply provided by the power unit 22. Therefore, when not in portable mode, a user can choose to power the exchangeable-battery photocuring device 1 by the power unit 22, whereas in the portable mode, a user can choose to power the exchangeable-battery photocuring device 1 by the exchangeable battery module 12.

Further, the battery 123 of the exchangeable battery module 12 is controlled by the control module 16 to charging or discharging, and the exchangeable battery module 12 of the present invention can be repeatedly charged/discharged. In an embodiment, the battery 123 can be charged by an external power supply provided by the power unit 22 via the control module 16; in another embodiment, the battery 123 is charged by an external charger (not shown). In an embodiment, the battery 123 has a plurality of cells and a protection plates and a jack for charging and discharging (not shown). For radiation of a plurality of UV LED, general photocuring devices require high voltage and wattage. However, most conventional portable power supply (or power banks) is 5V. The exchangeable battery module 12 of the present invention can provide a high-voltage and high-wattage battery 123. Voltage includes but is not limited to 12V, 24V or 48V; and wattage includes but is not limited to 12 W, 18 W, 36 W, 48 W and 60 W to solve the problem of inadequate voltage faced by photocuring devices having power banks or the problem of abnormality of photocuring devices, aging or damage to power module due to power banks supplying wrong wattage.

Figure 4:
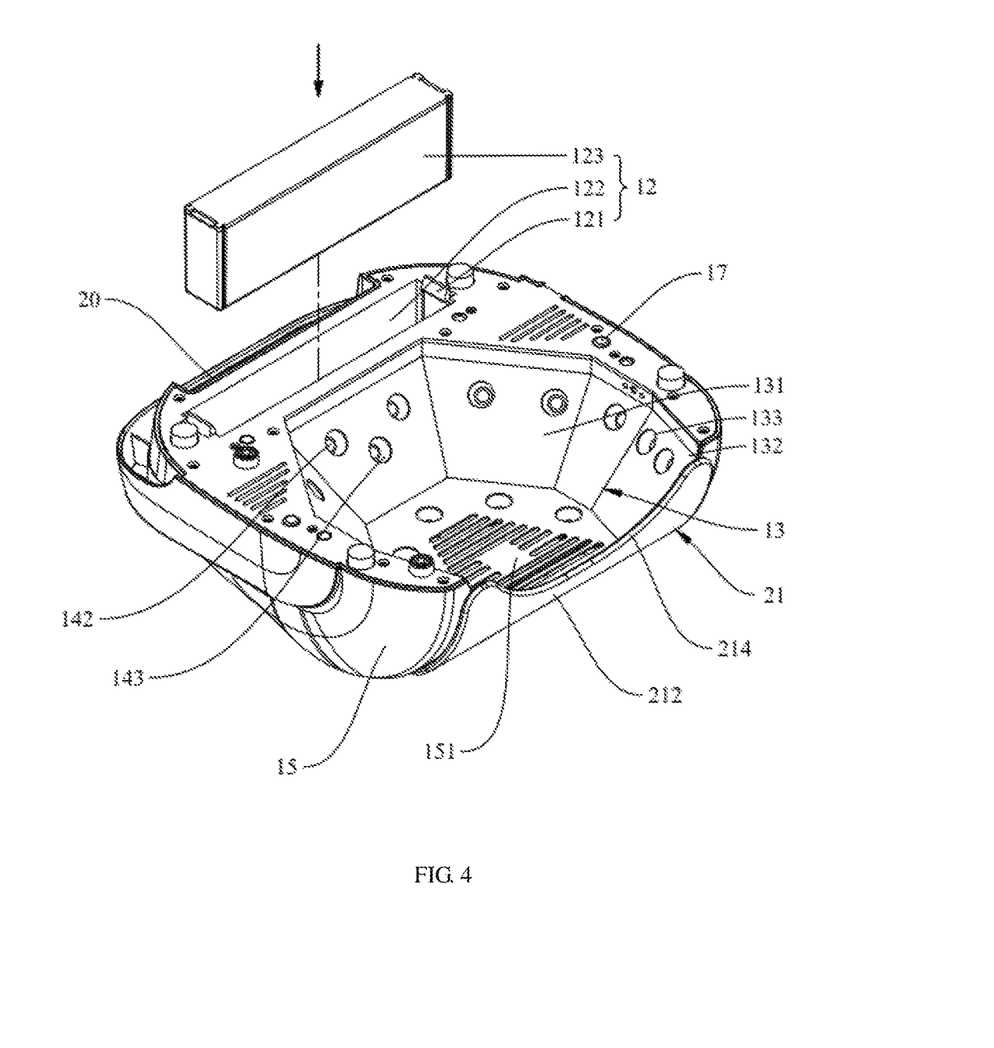
FIG. 4 is a battery-insertion diagram of a preferred embodiment of the present invention.

As shown in FIG. 4, the battery holder 122 of the present invention fixes the battery 123 through an easy detachable means, and the easy detachable means is a tenon structure, a buckle structure, a magnetic structure, a spring structure, a jack strip structure or a screw structure. In this embodiment, the battery holder 122 holds the battery 123 through a buckle 121, and the battery holder 122 further has a jack strip structure so that the battery 123 can be ejected from the battery holder 123 easily.

To facilitate a user in installing the battery 123, the exchangeable battery module 12 of the present invention further has a fool-proof design, which can apply a position-pairing means, shape-pairing means, space-pairing means, pattern-pairing means, pattern or color prompt means to prevent the battery 123 from being inserted into the battery holder 122 from a wrong direction. The present invention does not limit the means of foresaid fool-proof design. In a preferred embodiment, one or a plurality of first positioning portion is disposed on one side or two sides of the battery 123, and a second positioning portion is disposed on one side or two sides of the battery holder 122 corresponding to the first positioning portion. The first positioning portion and the second positioning portion are in order to prevent the wrong battery-insertion. If the battery 123 is inserted from the wrong direction by a user, the first positioning portion of the battery cannot correspond to the second positioning portion of the battery holder, i.e., the battery 123 cannot be inserted to the battery holder 122. If the battery 123 is inserted from the right direction, the first positioning portion of the battery 123 can correspond to the second positioning portion of the battery holder 122, i.e., the battery 123 can be successfully inserted into the battery holder 122. In another preferred embodiment, there is a special shape pairing mechanism between the battery 123 and the battery holder 122 so that the battery 123 cannot be inserted into the battery holder 122 when the battery 123 is in a wrong orientation/direction. The virtue of such design is that if a user intends to insert the battery 123 from a wrong direction, the battery 123 cannot be inserted into the battery holder 122 from the beginning so that the battery 123 would not be found to be installed incorrectly after the battery 123 is inserted to the battery holder 122.

With the exchangeable battery module, the present invention allows a user to bring several spare batteries 123 when the device is in portable mode in order to solve the problem of inadequate power faced by the portable photocuring devices. In addition, in the case of aging or damage to the internal battery of the exchangeable-battery photocuring device 1, the battery 123 can be replaced without eliminating the whole device, which extends the service life of the device and reduce the maintenance cost.

The supporting frame 13 is deposed on the base 11 for supporting and fixing the entire internal structure of the exchangeable-battery photocuring device, especially for supporting the UV LED module to be disposed at the preferred irradiation position. The supporting frame 13 has a plurality of walls 131, which can have holes 133, wherein the holes 133 can be disposed in positions corresponding to the placement of fingernails or toenails of human into the exchangeable-battery photocuring device. The said plurality of walls 131 and the base 11 constitute a chamber having at least one opening where a user can place a palm or a foot into the said chamber through the said opening (or the opening of the supporting frame 132). In addition, the bottom of the supporting frame 13 has a plurality of foot pads, wherein the foot pads can penetrate through the base 11 so that the exchangeable-battery photocuring device 1 can remain secured and not slippery regardless of with or without the base 11. Moreover, the foot pad is slightly elevated, which allows the vent 112 on the base 11 to effectively exhaust hot air and assist the heat dissipation of the exchangeable-battery photocuring device 1 during operation when the base 11 is in use.

A UV LED module 14 is disposed on the supporting frame 13 and further comprises a board 141 and a plurality of UV LED 142; wherein the UV LED module 14 can emit light toward the base 11. To improve the photocuring efficiency of the UV LED module 14, in this embodiment, the UV LED module 14 further comprises a plurality of cone reflectors 143 at the surrounding of the UV LED 142, and the opening of the cone reflector 143 goes through the hole 133 of the supporting frame 13, so that the light emitted by the UV LED 142 radiates not only towards the base 11, but, more specifically towards the position of fingernails or toenails. On the other hand, the plurality of the walls 131 of the supporting frame 13 and the base 11 are reflective, wherein the plurality of the walls 131 are disposed in the direction corresponding to fingernails and/or toenails so that the light emitted by the UV LED module 14 can be better utilized.

Moreover, to avoid shortened lifetime and for safety concerns of the electronic components in the exchangeable-battery photocuring device 1 due to the concentrated heat generated during the operation of the UV LED module 14, the present invention may also further set on a heat dissipation module, which is preferred disposed between the supporting frame and outer housing. The heat dissipation module can be various means that can dissipate heat, such as metal core PCB (MCPCB), heat sink, radiation fin, and/or fan. The present invention does not limit foresaid heat dissipation means. In this embodiment, the heat dissipation module 18 is composed of a plurality of heat sinks disposed on the UV LED module 14 so that the heat generated during the operation of the UV LED module 14 can be dissipated effectively. In addition, the holes 133 of the supporting frame 13 can not only target the irradiation of UV LED 142 on fingernails or toenails but also assist the UV LED module 14 in heat dissipation.

The control module 16 can be disposed inside the outer housing 15 and/or on the outer housing 15. The control module 16 of the present invention comprises a control board 161 for controlling the UV LED module 14, and a control button 162 or a control panel, wherein the control button 162 or the control panel may be exposed outside of the outer housing 15. In this embodiment, the control module 16 of the present invention uses a control board 161 and a control button 162 to control the operation. The power of the control module 16 can come from the exchangeable battery module 12 or the power unit 22 so that the control module 16 can control the switch of the UV LED module 14.

To make it more convenience for the users, the present invention further comprises a display module 19, wherein the display module 19 is electrically connected to the control module 16; and the display module 19 may be a touch screen, a display screen, a digital screen or a plurality of indicating lights. Moreover, the present invention does not exclude the display module 19 having both a screen and indicating lights. In this embodiment, the display module 19 is a display screen 191, wherein the display screen 191 is disposed on the outer housing 15 and the display module 19 is electrically connected to the control module 16 so that the operation message of the control module 16 can be displayed on the display screen 191.

In addition to the aforementioned display module 19, the present invention may also comprise a light unit 152 for displaying operation condition. In the present embodiment, the light unit 152 is a backlight panel, wherein the backlight panel is electrically connected to the control module 16 so that the backlight panel can display a backlight pattern and present it on the outer housing 15 during the operation of the exchangeable-battery photocuring device 1. The light unit 152 is disposed in a way that an operator of the exchangeable-battery photocuring device 1 (such as a nail artist) can still quickly determine the status of the exchangeable-battery photocuring device 1 through the display status of the light unit 152 without changing the position of the operator or the device when the operator is at the non-opening side of the exchangeable-battery photocuring device, which makes the operation much easier.

The outer housing 15 covers the UV LED module 14 and the supporting frame 13, and has an exterior opening 151 corresponding to the opening of the supporting frame 132 so that a user can insert a hand or a foot from the exterior opening 151.

To enhance the portability, the exchangeable-battery photocuring device 1 comprises a handle 20, wherein the handle 20 is disposed on the outer housing 15, and the handle 20 can be a movable handle or a fixed handle. In a preferred embodiment, the handle 20 is disposed on the outer housing 15 by a detachable means or is integrally formed with the outer housing 15, wherein the detachable means may be, for example, a buckle structure, a tenon structure or a screw structure; and the present invention does not limit the detachable means.

In order to further improve the comfort of holding for users, the handle 20 is designed to fit the size of a human grip and holding. In a preferred embodiment, the handle 20 is provided with a hand-held positioning portion, wherein the hand-held positioning portion is one or a plurality of grooves or notches, wherein the grooves or notches are corresponding to the finger position at holding. In another embodiment, the hand-held positioning portion of the handle 20 is an anti-slip design or structure. The exchangeable-battery photocuring device 1 with a handle 20 can greatly enhance the convenience of movement and portability, further increase the portability of the photocuring device and improve the defect arising from the rectangular or arc shape of the conventional photocuring devices, which is convenient for design but inconvenient for movement.

The advantage of the aforementioned technical features is that the exchangeable-battery photocuring device 1 can be powered by the battery 123 that serves as an internal power supply provided by the exchangeable battery or by external power supply provided by the power unit. A user can make a choice according to the needs. Such design has improved the limitation of conventional photocuring device that is powered by external power supply, which is constrained by the location of outlet and length of power cord. Moreover, the user can prepare several spare batteries 123 for replacement when access to external power supply is limited. The exchangeable-battery photocuring device 1 also adopts several technical features that improve the efficiency of photocuring, and thus can be operated for a long time.

II. Second Embodiment

The exchangeable battery photocuring device 1 of the second embodiment is the same as that of the first embodiment, which comprises a base 11, an exchangeable battery module 12, a supporting frame 13, a UV LED module 14, an outer housing 15, a control module 16, a heat-dissipation module 18, a display module 19 and a handle 20. The difference is that outer housing 15 of the second embodiment further has a slidable lid portion 21 (as shown in FIG. 1), forming an exchangeable-battery photocuring device with a slidable lid.

In this embodiment, the slidable lid portion 21 comprises a slide track 211, configured on periphery of the external opening 151 of the outer housing 15, a sliding element, corresponding to the slide track 211, a lid 212, configured to have the sliding element and slides up and down through the slide track 211; and a plurality of magnetic positioning elements 213, allowing the outer housing 15 and the lid 212 to mutually magnetic attract to each other in order to position the lid. Preferably, the disposition of the sliding element corresponds to the slide track 211 so that the sliding element can slide freely along the slide track 211 rather than be fixed at a specific position of the slide track 211. Such feature allows the lid having the sliding element 212 to slide smoothly along the slide track 211, and allows the plurality of magnetic positioning elements 213 to freely position the lid 212 at a desired position.

The lower end of the lid 212 has a curved surface 214, wherein the curved surface 214 is disposed relative to the external opening 151 of the outer housing 15 and the opening of the supporting frame 13. Therefore, when the lid 212 is at the open position, a user can insert a hand or a foot from the external opening 151 of the outer housing 15 and the opening of the supporting frame 13 so that the inserted palm or foot is placed in the chamber. Once the lid 212 is slid down, the curved surface 214 of the lid 212 can cause less pressure to the user's hand or foot, and can effectively shield the light of UV LED 142 scattering from the opening during the operation of the UV LED module 14, and thus reduces the light hazard produced by the photocuring device. Moreover, the lid 212 of the present invention can be slid smoothly and freely positioned. Therefore, the lid 212 can be freely positioned to the desirable position according to the hand size or the foot size of the user to avoid unpleasant user experience, such as discomfort resulting from the pressure of the lid 212 on the user's hand.

III. Third Embodiment

The third embodiment is a portable battery photocuring device with a slidable lid (not shown), comprising a supporting frame, a battery module, a power unit, a UV LED module, an outer housing, a control module and a slidable lid portion. The main difference between the third embodiment and the second embodiment is that the battery module is not exchangeable. In this embodiment, the charging or discharging of the battery is controlled by the control module, wherein the battery can be charged and discharged repeatedly. The battery of this embodiment is charged by the control module via the external power supply provided by the power unit.

In this embodiment, a base, a handle, a heat-dissipation module, a display module and a light unit may also be further configured. The configuration of the base, handle, heat-dissipation module, display module and light unit is the same as the first embodiment.

In conclusion, the exchangeable-battery photocuring device, exchangeable battery photocuring device with a slidable lid and portable battery photocuring device with a slidable lid of the present invention has improved the power supply mode of the conventional photocuring devices, which can only rely on external power supply. The present invention increases the mobility of photocuring devices through rechargeable batteries, making portable photocuring device a reality. Moreover, the present invention also allows a handle and exchangeable battery module, which make the device portable and further enhance the portability of the photocuring device so that the application of the photocuring devices is less restricted by location and space. Furthermore, the slidable lid portion of the prevent invention can be smoothly slid and positioned freely so that it can effectively shield the UV light from the opening of the UV LED when the photocuring device is under operation, and thus reduces the light hazard caused by the photocuring device.

The present invention is more detailed illustrated by the above preferable example embodiments. While example embodiments have been disclosed herein, it should be understood that other variations may be possible. Such variations are not to be regarded as a departure from the spirit and scope of example embodiments of the present application, and all such modifications as would be obvious to one skilled in the art are intended to be included within the scope of the following claims.

What is claimed is:

1. An exchangeable-battery photocuring device, comprising:
    a supporting frame, having a plurality of walls, and the plurality of walls constitute a chamber having at least one opening;
    a UV LED module, disposed on the supporting frame and further comprising a board and at least one UV LED; wherein the UV LED module is able to emits light toward the base;
    an outer housing, disposed on top of the support frame and covering the UV LED module, wherein the outer housing has an external opening corresponding to the opening of the supporting frame;
    a control module, disposed on or inside of the outer housing, wherein the control module comprises a control board for controlling the UV LED module, and a control button or a control panel;
    an exchangeable battery module, disposed on or inside of the outer housing, wherein the exchangeable battery module comprises a battery holder and a battery in which the battery further comprising one or a plurality of first positioning portion disposed on one side or two sides of the battery, and the battery holder further comprising a second positioning portion disposed on one side or two sides of the battery holder corresponding to the first positioning portion, and the exchangeable battery module is electrically connected to the control module; and
    a handle.

2. The exchangeable-battery photocuring device of claim 1, wherein the handle is a movable handle or a fixed handle.

3. The exchangeable-battery photocuring device of claim 2, wherein the handle is disposed on the outer housing by a detachable means or formed integrally with the outer housing; wherein the detachable means is a buckle structure, a tenon structure or a screw structure.

4. The exchangeable-battery photocuring device of claim 1, wherein the handle further comprises a handheld positioning portion; wherein the handheld positioning portion is one or a plurality of notch or an anti-slip structure.

5. The exchangeable-battery photocuring device of claim 1, further comprising: a power unit; wherein the power unit is able to connect to an external power supply, and the power unit is electrically connected to the control module.

6. The exchangeable-battery photocuring device of claim 5, wherein the battery is controlled by the control module to charge or discharge, and the battery is able to be charged by the power unit or by a charger.

7. The exchangeable-battery photocuring device of claim 6, wherein the battery holder holds the battery through a detachable means, and the detachable means is a tenon structure, a buckle structure, a magnetic structure, a spring structure, a jack strip structure or a screw structure.

8. The exchangeable-battery photocuring device of claim 6, further comprising a base, having one or a plurality of positioning portion for positioning user's fingers, wherein the base and the supporting frame are mutually assembled to each other through a plurality of magnetic element between the base and the supporting frame.

9. The exchangeable-battery photocuring device of claim 6, further comprising a heat-dissipation module configured between the supporting frame and the outer housing.

10. The exchangeable-battery photocuring device of claim 8, wherein the plurality of walls of the supporting frame and the base are light reflective.

11. The exchangeable-battery photocuring device of claim 6, wherein the UV LED module further comprises a plurality of cone reflectors set on the UV LED, and the openings of the cone reflectors toward the base through the supporting frame.

12. The exchangeable-battery photocuring device of claim 6, further comprising a display module electrically connected to the control module; and the display module is a touch screen, a display screen, a digital screen or a plurality of indicating lights.

13. The exchangeable-battery photocuring device of claim 6, further comprising a light unit for displaying operation condition.

14. An exchangeable-battery photocuring device with a slidable lid, comprising the exchangeable-battery photocuring device of claim 1 and a slidable lid portion configured on the outer housing; wherein the slidable lid portion comprises a slide track, configured on periphery of the external opening of the outer housing, a sliding element, corresponding to the slide track, a lid, having the sliding element and slidable through the slide track, and a plurality of magnetic positioning elements allowing the outer housing and the lid to mutually magnetic attract to each other in order to position the lid; wherein, the lower end of the lid has a curved edge, and the curved edge corresponds to the external opening of the outer housing and the opening of the supporting frame.

15. A portable battery photocuring device with a slidable lid, comprising:
   a supporting frame, having a plurality of walls, and the plurality of walls constitute a chamber having at least one opening;
   a UV LED module, disposed on the supporting frame and further comprising a board and at least one UV LED; wherein the UV LED module is able to emits light toward the base;
   an outer housing, disposed on top of the support frame and covering the UV LED module, wherein the outer housing has an external opening corresponding to the opening of the supporting frame;
   a control module, disposed on or inside of the outer housing, wherein the control module comprises a control board for controlling the UV LED module and a control button or a control panel;
   an exchangeable battery module, disposed on or inside of the outer housing, wherein the exchangeable battery module comprises a battery holder and a battery in which the battery further comprising one or a plurality of first positioning portion disposed on one side or two sides of the battery, and the battery holder further comprising a second positioning portion disposed on one side or two sides of the battery holder corresponding to the first positioning portion, and the exchangeable battery module is electrically connected to the control module; and
   a slidable lid portion, comprising a slide track, configured on periphery of the external opening of the outer housing, a sliding element, corresponding to the slide track, a lid, having the sliding element and slidable through the slide track, and a plurality of magnetic positioning element, allowing the outer housing and the lid to mutually magnetic attract to each other in order to position the lid.

16. An exchangeable-battery photocuring device, comprising:
   a supporting frame, having a plurality of walls, and the plurality of walls constitute a chamber having at least one opening;
   a UV LED module, disposed on the supporting frame and further comprising a board and at least one UV LED; wherein the UV LED module is able to emits light toward the base;
   an outer housing, disposed on top of the support frame and covering the UV LED module, wherein the outer housing has an external opening corresponding to the opening of the supporting frame;
   a control module, disposed on or inside of the outer housing, wherein the control module comprises a control board for controlling the UV LED module and a control button or a control panel;
   an exchangeable battery module, disposed on or inside of the outer housing, wherein the exchangeable battery module comprises a battery holder and a battery in which the battery further comprising one or a plurality of first positioning portion disposed on one side or two sides of the battery, and the battery holder further comprising a second positioning portion disposed on one side or two sides of the battery holder corresponding to the first positioning portion, and the exchangeable battery module is electrically connected to the control module; and a base.

17. An exchangeable-battery photocuring device, comprising:
   a supporting frame, having a plurality of walls, and the plurality of walls constitute a chamber having at least one opening;
   a UV LED module, disposed on the supporting frame and further comprising a board and at least one UV LED; wherein the UV LED module is able to emits light toward the base;
   an outer housing, disposed on top of the support frame and covering the UV LED module, wherein the outer housing has an external opening corresponding to the opening of the supporting frame;
   a control module, disposed on or inside of the outer housing, wherein the control module comprises a control board for controlling the UV LED module and a control button or a control panel; and an exchangeable battery module, disposed on or inside of the outer housing, wherein the exchangeable battery module comprises a battery holder and a battery in which the battery further comprising one or a plurality of first positioning portion disposed on one side or two sides of the battery, and the battery holder further comprising a second positioning portion disposed on one side or two sides of the battery holder corresponding to the first positioning portion, and the exchangeable battery module is electrically connected to the control module.

\* \* \* \* \*